United States Patent [19]

Takeuchi

[11] Patent Number: 5,177,718
[45] Date of Patent: Jan. 5, 1993

[54] OPTICAL DISK APPARATUS

[75] Inventor: Ryoji Takeuchi, Yokohama, Japan

[73] Assignee: Kabushiki Kaisha Toshiba, Kawasaki, Japan

[21] Appl. No.: 425,912

[22] Filed: Oct. 24, 1989

[30] Foreign Application Priority Data

Oct. 31, 1988 [JP] Japan .................. 63-275602

[51] Int. Cl.⁵ ............................ G11B 7/085
[52] U.S. Cl. .................. 369/32; 369/44.25; 369/44.28
[58] Field of Search .......... 369/44.21, 44.25, 396/32, 33, 44.11, 44.13, 44.27, 44.28, 44.29, 44.32, 44.34, 44.35, 59; 358/342, 907; 360/78.04, 78.05

[56] References Cited

U.S. PATENT DOCUMENTS

| 4,037,252 | 7/1977 | Janssen | 358/128 |
| 4,684,797 | 8/1987 | Ando et al. | 250/201 |
| 4,694,443 | 9/1987 | Ando | 369/46 |
| 4,701,897 | 10/1987 | Nakagawa | 369/32 |
| 4,764,911 | 8/1988 | Mokota et al. | 369/32 |
| 4,887,253 | 12/1989 | Tateishi | 369/32 |
| 4,918,676 | 4/1990 | Miyasaka | 369/32 |
| 4,942,563 | 7/1990 | Yamamuro | 369/44.21 X |

FOREIGN PATENT DOCUMENTS 0154302 9/1985 European Pat. Off.
0270357 6/1988 European Pat. Off.
63-103435 5/1988 Japan.

Primary Examiner—Aristotelis Psitos
Assistant Examiner—Muhammad N. Edun
Attorney, Agent, or Firm—Finnegan, Henderson, Farabow, Garrett and Dunner

[57] ABSTRACT

An optical disk apparatus comprising a head having an objective lens, a tracking controller, a CPU, and a counter. The CPU determines a tracking error if the count of the counter is greater than a predetermined value when the disk is rotated 360° after the counter has been cleared during data-reproducing operation. Then, the CPU outputs a tracking re-try signal to the tracking controller. In response to this signal, the controller locks the lens at the center position within the head. Then, the frequency of vibration of the lens decreases so much that servo tracking is no longer required. When the relative rate-of-change of tracking position between the head and the disk has decreased sufficiently, the CPU determines that the head is applying a laser beam onto the target track of the disk. Thus, every time a tracking error is made due to an external force, the servo tracking is automatically performed, and the apparatus is therefore reliable. The CPU also outputs a tracking re-try signal if the head is stopped upon completion of coarse accessing of an optical disk. In this case, the lens is locked at the center position. Therefore, the vibration of the lens can be suppressed within a short time after the completion of the coarse accessing. As soon as the relative rate-of-change of tracking position between the lens and the disk decreases sufficiently, the head starts applying a laser beam onto the target track of the disk, thus tracking the optical disk.

12 Claims, 6 Drawing Sheets

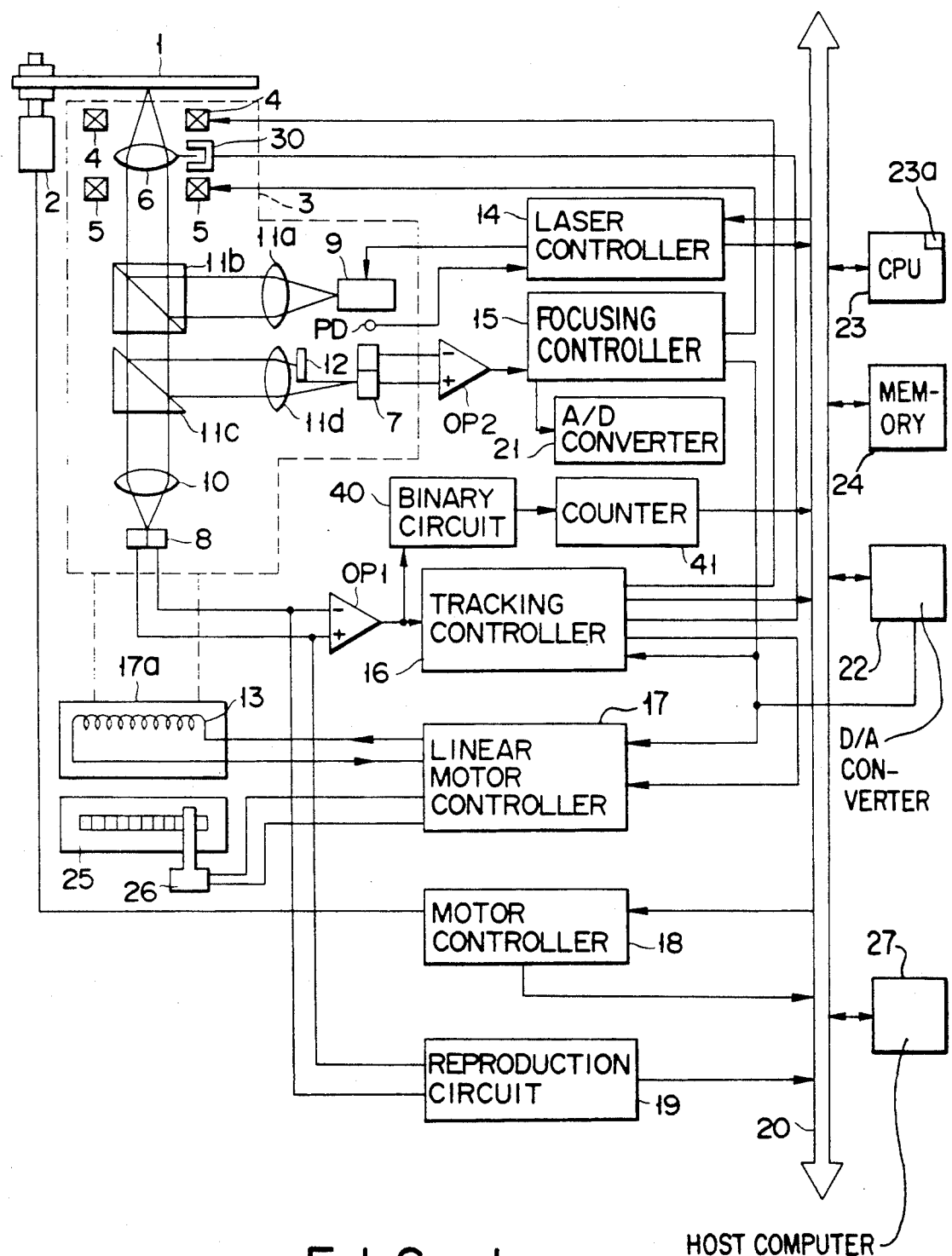
F I G. 1

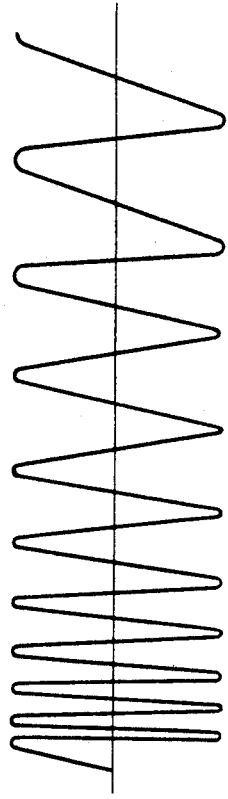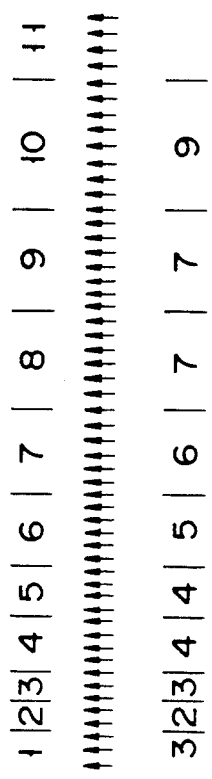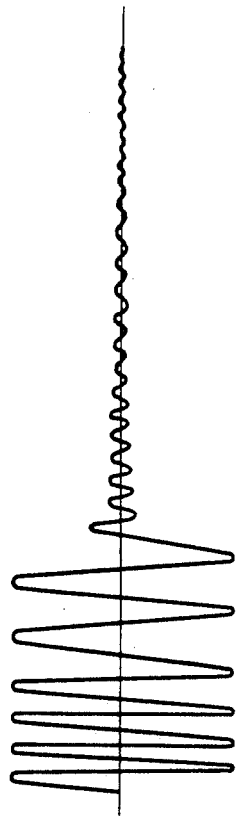
F.I.G. 5A  TRACKING-ERROR SIGNAL α (TRACKING-OFF)
F.I.G. 5B  BINARY SIGNAL β
F.I.G. 5C  COUNT VALUE γ
F.I.G. 5D  SAMPLING PULSES
F.I.G. 5E  NUMBER OF PULSES CORRESPONDING TO COUNT VALUE
F.I.G. 5F  TRACKING-ERROR SIGNAL (TRACKING-ON) (WHEN γ=δ)

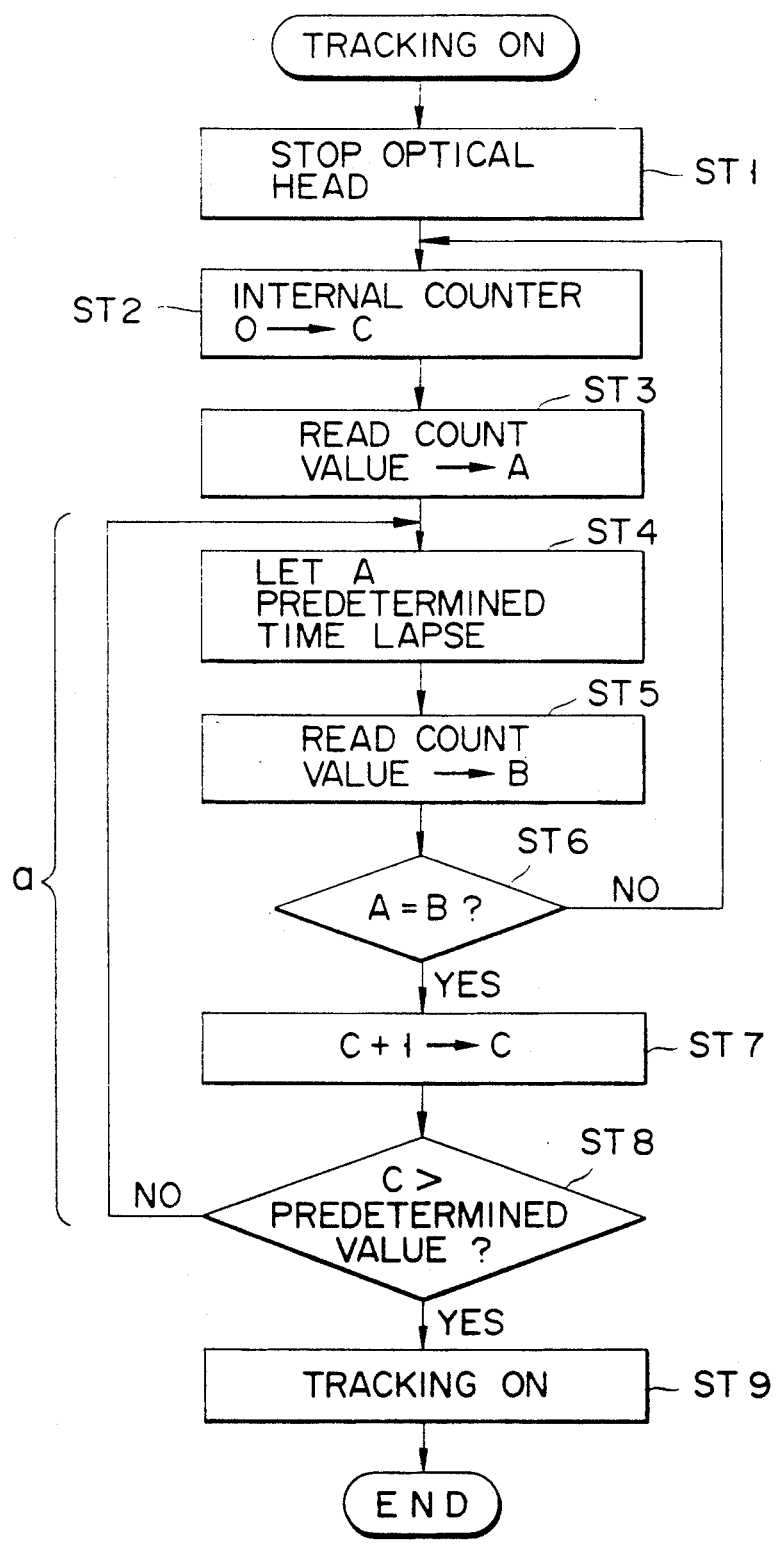
F I G. 7

OPTICAL DISK APPARATUS

BACKGROUND OF THE INVENTION

1. Field of the Invention

The present invention relates to an optical disk apparatus and, more particularly to an optical disk apparatus wherein data can be optically recorded on, and reproduced from, the tracks of a memory disk while the disk and an optical head are moving relative to each other.

2. Description of the Related Art

Optical disk apparatuses have been in practical use, each typically having an optical head comprising a semiconductor laser and an objective lens. The laser emits a beam, and the objective lens focuses the laser beam onto a track of an optical disk which is spinning and located near the optical head, thereby to record data on the track or to reproduce data therefrom. The optical head undergoes focus control so that the objective lens focuses the laser beam appropriately. Also, the head undergoes tracking control so that the laser beam focused by the objective lens is applied onto a desired track.

The optical disk apparatus further has a linear motor and an objective drive mechanism, as is disclosed in U.S. Pat. No. 4,037,252. The linear motor moves the optical head in the radial direction of the optical disk, when the apparatus is set in a coarse access mode. The objective drive mechanism also moves the objective lens toward or away from the optical disk, when the apparatus is set in the fine access mode.

To access any target track of the optical disk, the apparatus is first set in coarse access mode. In the coarse access mode, the linear motor moves the optical head toward the target track. The head applies a laser beam to the optical disk. The beam is reflected from one of the tracks, and the position of this track is determined from the reflected laser beam. If the position thus determined greatly differs from the position of the target track, the apparatus is continuously set in the coarse access mode. Hence, the linear motor is driven again, moving the head toward the target track. If the position differs a little from that of the target track, the access mode is changed to the fine access mode. In this case, the objective drive mechanism moves the objective lens to focus the laser beam, thus achieving a fine access to the target track.

The optical disk apparatus further comprises a position detector. While the apparatus is set in the coarse access mode, this detector reads, or scans, the optical scale mounted on the optical head, thereby determining the position of the head and, thus, the distance the head has been moved.

The optical disk apparatus, described above, has two drawbacks. First, once the optical head is vibrated due to an external force and fails to track a target track after it has been moved by the linear motor or during the optical reproduction of the recorded data, it can no longer track any track. Second, the optical head can hardly accomplish a stable tracking, for the reason discussed in the following paragraph.

Since the objective lens is suspended from a fixed member by a wire suspension, it is vibrated in the radial direction of the optical disk when the head is stopped, due to the deceleration of the linear motor. If the laser emits a beam onto the disk while the objective lens is vibrating, the position of the track to which the head has been moved cannot be detected correctly. Hence, the laser is not turned on, or the objective drive mechanism does not move the objective lens, until a period of time (about 20 msec), which is slightly longer than the time the lens requires to stops vibrating, elapses after the optical head has been stopped. In other words, the tracking of the disk is started upon lapse of a predetermined time after the head has been stopped, regardless of the relative speed between the head and the disk. When this relative speed is higher than the normal value because the disk is eccentrically located with respect to the spindle of the disk apparatus, or because the lens is vibrating when the linear motor is stopped, a tracking error signal generated from the laser beam reflected from the disk will have a frequency exceeding a predetermined tracking-servo range. Consequently, the optical head cannot achieve a stable tracking.

SUMMARY OF THE INVENTION

It is an object of the present invention to provide an optical disk apparatus which is reliable in that the optical head can track any track of an optical disk even after it has failed to track a target track due to an external force applied to it upon stopping at a target track or while optically reproducing data from the disk.

Another object of the invention is to provide an optical disk apparatus in which the optical head can achieve a stable tracking upon stopping at a target track of an optical disk, thus accessing the target track with high accuracy within a short period of time.

According to the present invention, there is provided an optical disk apparatus comprising:

an optical head having focusing means for focusing a light beam onto an optical recording medium having tracks, and detecting means for detecting the light beam reflected from the optical recording medium;

drive means for moving the focusing means in a direction perpendicular to the axis of the light beam;

signal-generating means for generating a tracking-error signal in response to a detection signal output from the detecting means;

tracking means for causing the drive means to move the focusing means to a target track of the optical recording medium, in response to the tracking-error signal generated by the signal-generating means;

first judging means for determining a tracking error from the tracking-error signal generated by the signal-generating means;

positioning means for causing the drive means to move the focusing means to a predetermined position within the optical head when the first judging means determines a tracking error;

second judging means for determining a relative rate-of-change of tracking position between the focusing means and the optical recording means from the frequency of the tracking-error signal when the focusing means is moved to the predetermined position within the optical head; and control means for controlling the tracking means such that the tracking means causes the drive means to stop moving the focusing means when first judging means determines a tracking error, and to start moving the focusing means when the second judging means determines a decrease of the relative rate-of-change of tracking position between the optical recording medium and the focusing means which has been moved to the predetermined position within the optical head.

Further, according to the invention, there is provided an optical disk apparatus comprising:

an optical head having focusing means for focusing a light beam onto an optical recording medium having tracks, and detecting means for detecting the light beam reflected from the optical recording medium;

first drive means for moving the optical head in the radial direction of the optical recording medium;

second drive means for moving the focussing means in a direction perpendicular to the axis of the light beam;

first signal-generating means for generating a tracking-error signal in response to a detection signal output from the detecting means;

tracking means for causing the second drive means to move the focussing means to a target track of the optical recording medium, in response to the tracking-error signal generated by first the signal-generating means;

second signal-generating means for generating a signal for operating the second drive means, there by to move the focussing means to the target track;

positioning means for causing the second drive means to move the focussing means to a predetermined position within the optical head when the focussing means is moved to the target track;

judging means for determining a relative rate-of-change of tracking position between the focussing means and the optical recording means from the frequency of the tracking-error signal when the focussing means is moved to the predetermined position within the optical head; and control means for controlling the tracking means such that the tracking means causes the second drive means to stop moving the focussing means when first drive means starts moving the optical head toward the target track, and to start moving the focussing means when the optical head is moved to the target track, and the judging means determines a decrease of the relative rate-of-change of tracking position between the optical recording medium and the focussing means which has been moved to the predetermined position within the optical head.

BRIEF DESCRIPTION OF THE DRAWINGS

FIG. 1 is a block diagram illustrating an optical disk apparatus according to the present invention;

FIG. 5A illustrates the waveform of a tracking-error signal;

FIG. 5B shows a binary signal output by the binary circuit incorporated in the apparatus;

FIG. 5C shows how the count value of the counter used in the apparatus changes;

FIG. 5D is a diagram showing the sampling pulse signal generated by the oscillator incorporated in the apparatus;

FIG. 5E is a view for explaining the number of sampling pulses counted by an internal counter which corresponds to that counted by a counter;

FIG. 5F illustrates the waveform of a tracking-error signal different from the signal shown in FIG. 5A; and FIGS. 6 and 7 form a flow chart explaining the operation of the optical disk apparatus shown in FIG. 1.

DETAILED DESCRIPTION OF THE PREFERRED EMBODIMENTS

FIG. 1 schematically illustrates an optical disk apparatus, which is an embodiment of the present invention. As is shown in FIG. 1, an optical disk 1 is connected to a motor 2. The disk 1 is rotated at a constant speed when the motor 2 is driven under the control of a motor control circuit 18.

The optical disk 1 comprises a substrate made of glass or plastics and a doughnut-shaped recording layer made of metal such as tellurium or bismuth and coated on the substrate. The disk 1 has a spiral track or concentric tracks on the lower surface.

Figure 2:
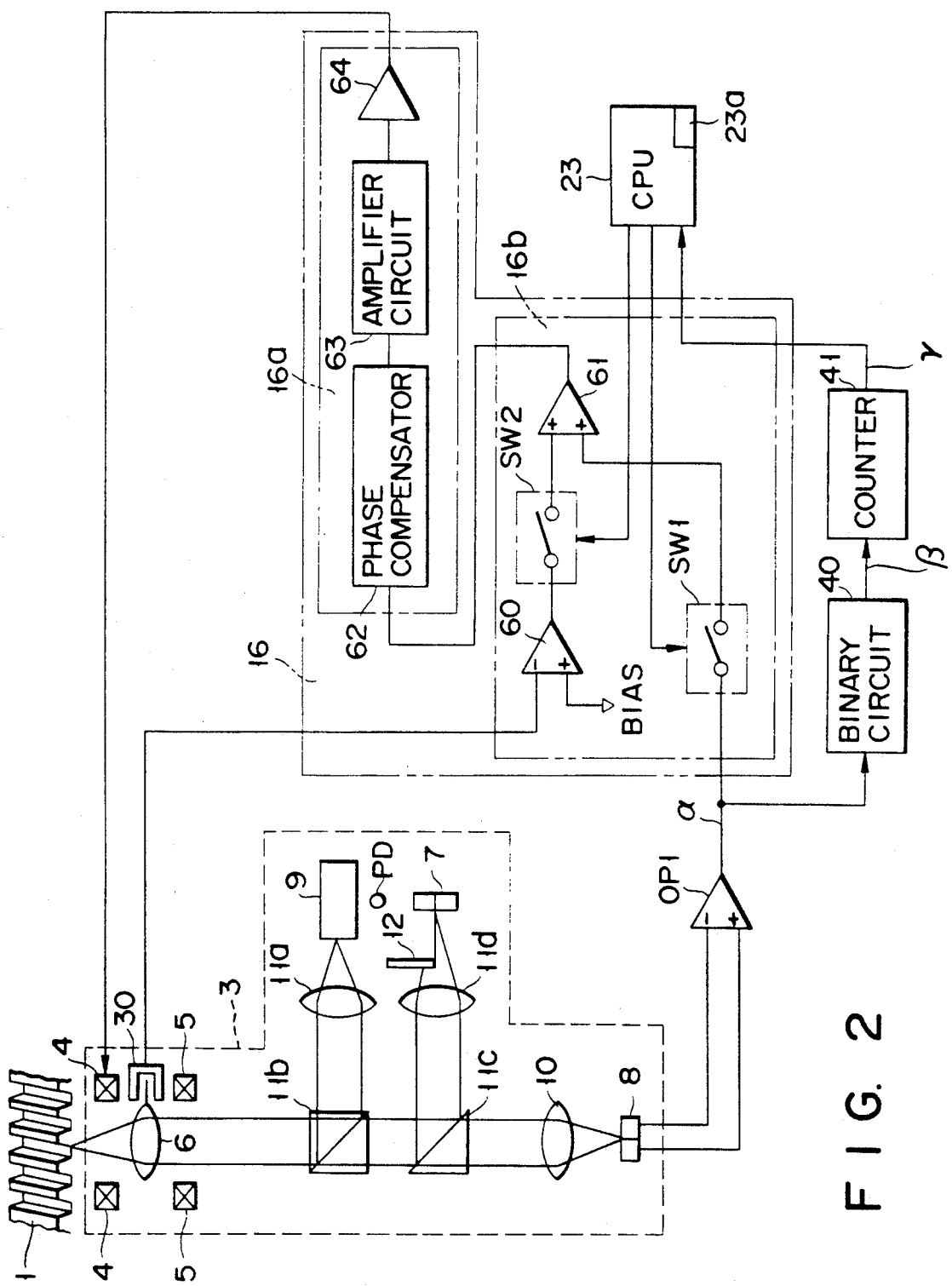
FIG. 2 is diagram showing the means incorporated in the apparatus, for suppressing the vibration of an objective lens.

An optical head 3 is located below the optical disk 1 and opposes the lower surface thereof. As is disclosed in U.S. Pat. No. 4,684,797, and as is illustrated in FIGS. 1 and 2, the optical head 3 comprises drive coils 4 and 5, an objective lens 6, a focus-position sensor 7, a tracking-position sensor 8, a semiconductor laser 9, a focusing lens 10, a collimator lens 11a, half-prisms 11b and 11c, another focusing lens 11d, a knife-edge 12, and a light-receiving element PD. The drive coils 4 and 5 are used to move the objective lens 6. The collimator lens 11a is designed to collimate the laser beam emitted from the semiconductor laser 9. The element PD is used to detect the intensity of the beam emitted from the laser 9. For the details of the optical system incorporated in the optical head 3, refer to U.S. Pat. No. 4,684,797.

Figure 3:
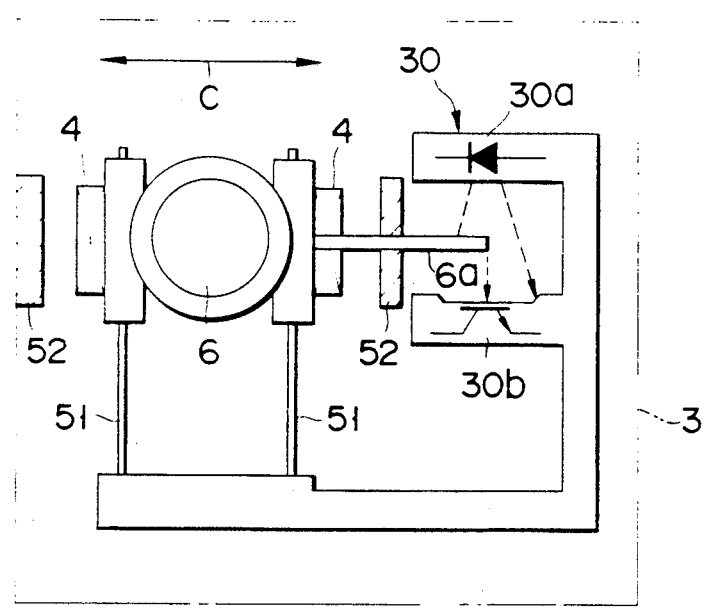
FIG. 3 is a plan view showing the optical head used in the apparatus shown in FIG. 1.

As is illustrated in FIG. 3, the objective lens 6 is suspended from a fixed member (not shown) by means of two wire suspensions 51. The lens 6 can be moved along its optical axis by means of the drive coils 5 to focus the laser beam to various degrees. It can also be moved orthogonal to the focusing direction, that is, in a direction which is perpendicular to its optical axis by means of the drive coils 4.

Permanent magnets 52 are attached to fixed members. These magnets 52 cooperate with the drive coils 4 to move the objective lens 6 in the direction of an arrow c (FIG. 3), that is, in the direction perpendicular to the optical axis of the lens 6.

A shield 6a is located close to the lens 6, and can be moved together with the lens. A sensor 30 is attached to the frame of the optical head 3, and opposes the shield 6a, in the sense that it does not move with lens 6. This sensor 30 comprises a photo-interrupter which includes an LED (Light-Emitting Diode) 30a and a phototransistor 30b functioning as a light-receiving element.

When the objective lens 6 is at its center position, the shield 6a assumes such a position to shield half the light emitted from the LED 30a, and the phototransistor 30b generates an electrical signal at an intermediate level. The more the lens 6 and the shield 6a move to the left, the more light the phototransistor 30b receives to generate an electrical signal at a higher level. The more the lens 6 and the shield 6a move to the right, the less light the phototransistor 30b receives to generate an electrical signal at a lower level. Thus, the signal output by the sensor 30 represents the position of the objective lens along an axis parallel to the direction of arrow C.

Figure 4:
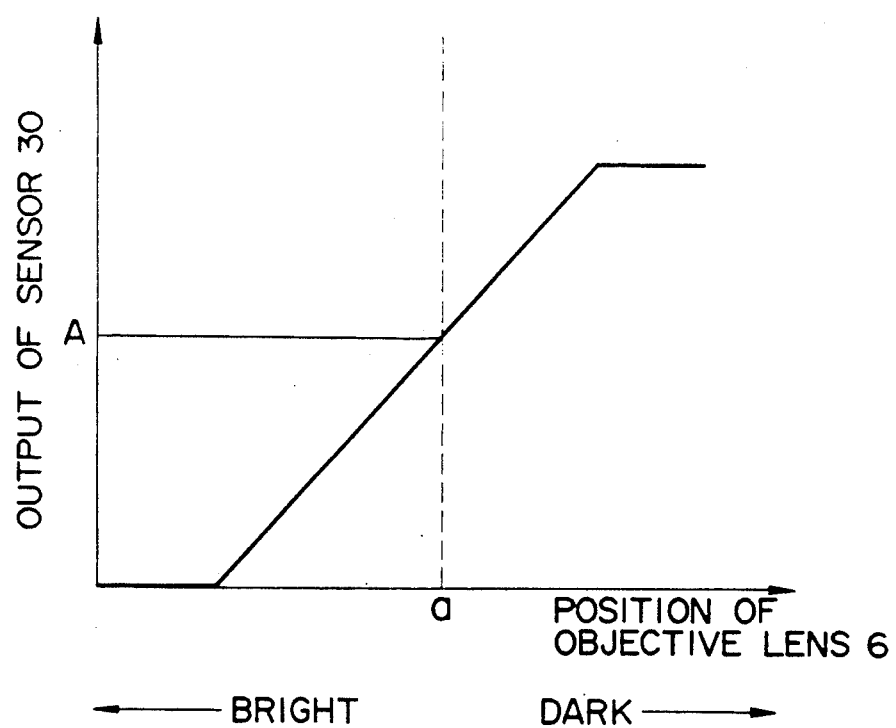
FIG. 4 is a graph representing the relationship between the position of the objective lens and the output of the sensor incorporated in the optical head.

FIG. 4 represents the operating characteristic of the sensor 30, more precisely the relationship between the output signal of the sensor 30 and the position of the objective lens 6. As is evident from FIG. 4, the output signal is at level A when the lens 6 is at its center position. As can be understood also from FIG. 4, the signal is at a higher level as the lens 6 is moved to the left (FIG. 3).

As is shown in FIG. 1, the optical head 3 is connected to a drive coil 13, which is a movable component of a linear motor 17a. This coil 13 is coupled to a linear motor controller 17. The position of the linear motor 17a is detected by a sensor 26, which is connected to the controller 17. The sensor 26 scans the optical scale 25 mounted on the optical head 3 and outputs an electrical signal representing the position of the linear motor 17a.

The linear motor 17a has a fixed component. A permanent magnet (not shown) is attached to this fixed component. When the drive coil 13 is excited under the control of the linear motor controller 17, it moves in the radial direction of the optical disk 1. As a result, the head 3, which is coupled to the drive coil 13, is moved in the radial direction of the disk 1.

When the semiconductor laser 9 is driven under the control of a laser control circuit 14, it emits a laser beam. The beam is applied onto the optical disk 1 via the collimator lens 11a, the half-prism 11b, and the objective lens 6. The beam reflected from the disk 1 is guided to the half-prism 11c through the objective lens 6 and half-prism 11b. The half-prism 11c splits the laser beam into two beams. The first beam transmitted from the half-prism 11c is applied to a pair of tracking-position sensors 8 through the focusing lens 10, whereas the second beam transmitted (reflected) from the half-prism 11c is applied to a pair of focus-position sensors 7 through the focusing lens 11d and the knife-edge 12.

The output signals of the tracking-position sensors 8 are input to a differential amplifier OP1. The amplifier OP1 generates a tracking-error signal $\alpha$ from the output signals of the sensors 8. The tracking-error signal $\alpha$, which has the waveform illustrated in FIG. 5A, is supplied from the amplifier OP1 to a tracking controller 16 and a binary circuit 40. The signal $\alpha$ is supplied from the tracking controller 16 to linear motor controller 17. In response to the tracking-error signal or the output signal of the sensor 30, the tracking controller 16 drives the drive coils 4, thereby moving the objective lens 6 in the tracking direction. Further, in response to a track-jump signal supplied from a CPU 23 (later described), the tracking controller 16 drives the drive coils 4, whereby the objective lens 6 jumps from one track to another.

The binary circuit 40 converts the tracking-error signal $\alpha$ to a binary signal $\beta$ which has the waveform shown in FIG. 5B. The binary signal $\beta$ is supplied to a counter 41. The counter 41 counts every binary signal output from the binary circuit 40, and outputs a signal which represents the count value $\gamma$ as is shown in FIG. 5C. This signal is supplied to the CPU 23.

The focus-position sensors 7 generate signals indicating the position of the focal point of the laser beam. These signals are input to an differential amplifier OP2. The output signal of the differential amplifier OP2 is input to a focusing controller 15. The output signal of this controller 15 is supplied to drive coils 5. These coils 5 move the objective lens 6 toward or away from the optical disk 1 in accordance with the signal supplied from the controller 15, thereby correctly focussing the laser beam onto the optical disk 1.

While the focusing control and the tracking control are being performed as described above, the tracking-position sensors 8 produce signals from the laser beam reflected from the pits formed in the track of the disk 1. These signals are input to a reproduction circuit 19. The reproduction circuit 19 processes the signals into image data and address data (e.g., the track number, or the like).

The laser controller 14, the focusing controller 15, the tracking controller 16, the linear motor controller 17, the motor controller 18, and the reproduction circuit 19 are coupled to the CPU 23 by means of a signal bus 20. Therefore, in a overall sense, they are all controlled by the CPU 23. The signal bus 20 is connected to a host computer 27, so that the number of any track accessed, the data read from the accessed track, and the image data reproduced by the reproduction circuit 19 can be supplied to the host computer 27.

An A/D converter 21 is connected between the focusing controller 15 and the signal bus 20. It converts the output of the focusing controller 15 into digital data. The digital data is input via the bus line 20 to the CPU 23 which is connected to the signal bus 20. A D/A converter 22 is coupled to the bus line 20 in order to receive data from, and supply data to, the focusing controller 15, the tracking controller 16, the linear motor controller 17 and the CPU 23.

The optical disk apparatus further comprises an oscillator (not shown) which generates such sampling pulses as are shown in FIG. 5D. The CPU 23 includes an internal counter 23a functioning as a loop counter. The internal counter 23a counts the sampling pulses whose number is proportional to the count value $\gamma$ which the counter 41 has upon completion of the coarse accessing or at the start of the re-tracking. This counting of sampling pulses is performed as is illustrated in FIG. 5E. When the count value of the internal counter 23a is 6 or more, the CPU 23 determines that the frequency of the tracking-error signal $\alpha$ has decreased, indicating a decrease in the rate of change of relative tracking position between the optical disk 1 and the objective lens 6. Then, the CPU 23 outputs a tracking-on signal to the tracking controller 16 and also to the counter 41.

The counter 41 is cleared by the tracking-on signal output from the CPU 23. When the count value $\gamma$ of the counter 41 is greater than a prescribed value upon lapse of a predetermined time thereafter, the CPU 23 determines that a tracking error has been made, that is, the laser beam has not been focused onto a target track of the optical disk 1. Then, the CPU 23 outputs a tracking re-try signal to the tracking controller 16.

The moment the disk 1 is rotated 360° for the first time after the counter 41 has been cleared during the data-reproducing operation, the CPU 23 determines whether or not the count value $\gamma$ of the counter 41 is greater than a prescribed value. If YES, the CPU 23 determines that a tracking error has been made. In this case, too, the CPU 23 outputs a tracking re-try signal to the tracking controller 16.

The tracking controller 16 will now be described in detail, with reference to FIG. 2. As is illustrated in this figure, the tracking controller 16 comprises a tracking circuit 16a and a switching circuit 16b. The switching circuit 16b has a changeover switch SW1 connected to the output of the differential amplifier OP1, a differential amplifier 60 whose inverting input is coupled to the sensor 30 (i.e., phototransistor 30b), a changeover switch SW2 connected to the output of the differential amplifier 60, and a two-input adder 61 whose inputs are connected to the changeover switches SW1 and SW2, respectively. Both changeover switches SW1 and SW2 are connected to the CPU 23 and controlled by a switching signal supplied therefrom. The tracking circuit 16a includes a phase compensator 62 coupled to the output of the adder 61. an amplifier circuit 63 connected to the output of the phase compensator 62. and a driver circuit 64 coupled to the output of the amplifier circuit 63.

In operation. the tracking-error signal α is supplied from the differential amplifier OP1 to the changeover switch SW1 of the switching circuit 16b. The switch SW1 is turned on or off in accordance with the switching signal supplied from the CPU 23. As long as the switch SW1 remains off. the tracking-error signal α is not supplied to the adder 61. When the switch SW1 is turned on that the signal α is supplied to the adder 61.

The electrical signal output by the sensor 30. whose level represents the position of the objective lens 6. is input to the inverting input of the differential amplifier 60. A reference signal. whose level represents the reference position of the lens 6. is input to the non-inverting input of the differential amplifier 60. Hence. the amplifier 60 produces a position signal whose level represents the distance. or difference. between the reference position and actual position of the objective lens 6. The position signal is supplied to the changeover switch SW2. The switch SW2 is turned on or off in accordance with the switching signal output from the CPU 23. Until the switch SW2 is turned on. the position signal is not supplied to the adder 61. When the switch SW2 is turned on. the voltage is supplied to the adder 61.

The output signal of the adder 61 is supplied to the phase compensator 62 of the tracking circuit 16a. The compensator 62 compensates the phase of either the tracking-error signal α or the position signal. The signal. thus phase-compensated. is supplied to the amplifier circuit 63 and amplified. The amplified signal is input to the driver circuit 64. In accordance with the input signal. the driver circuit 64 controls the drive coils 4. whereby objective lens 6 is moved in the direction of arrow C (FIG. 3). that is. in the radial direction of the optical disk 1.

When the CPU 23 inputs the tracking-on signal to the tracking controller 16. the switches SW1 and SW2 are turned on and off. respectively. In contrast. when the CPU 23 supplies the tracking re-try signal to the controller 16. the switches SW1 and SW2 are turned off an on. respectively. In the former case. the tracking-error signal α is supplied from the CPU 23 to the driver 64 via the switch SW1. the adder 61. the phase compensator 62. and the amplifier circuit 63. whereby the driver 64 drives the drive coils 4. thus achieving a tracking control. In the latter case. the position signal is supplied from the differential amplifier 60 to the driver 64 via the switch SW2, the adder 61. the phase compensator 62. and the amplifier circuit 63. whereby the driver 64 drives the drive coils 4. such that the lens 6 is moved to a predetermined position within the optical head 3. i.e.. the center position with in the head 3.

Figure 6:
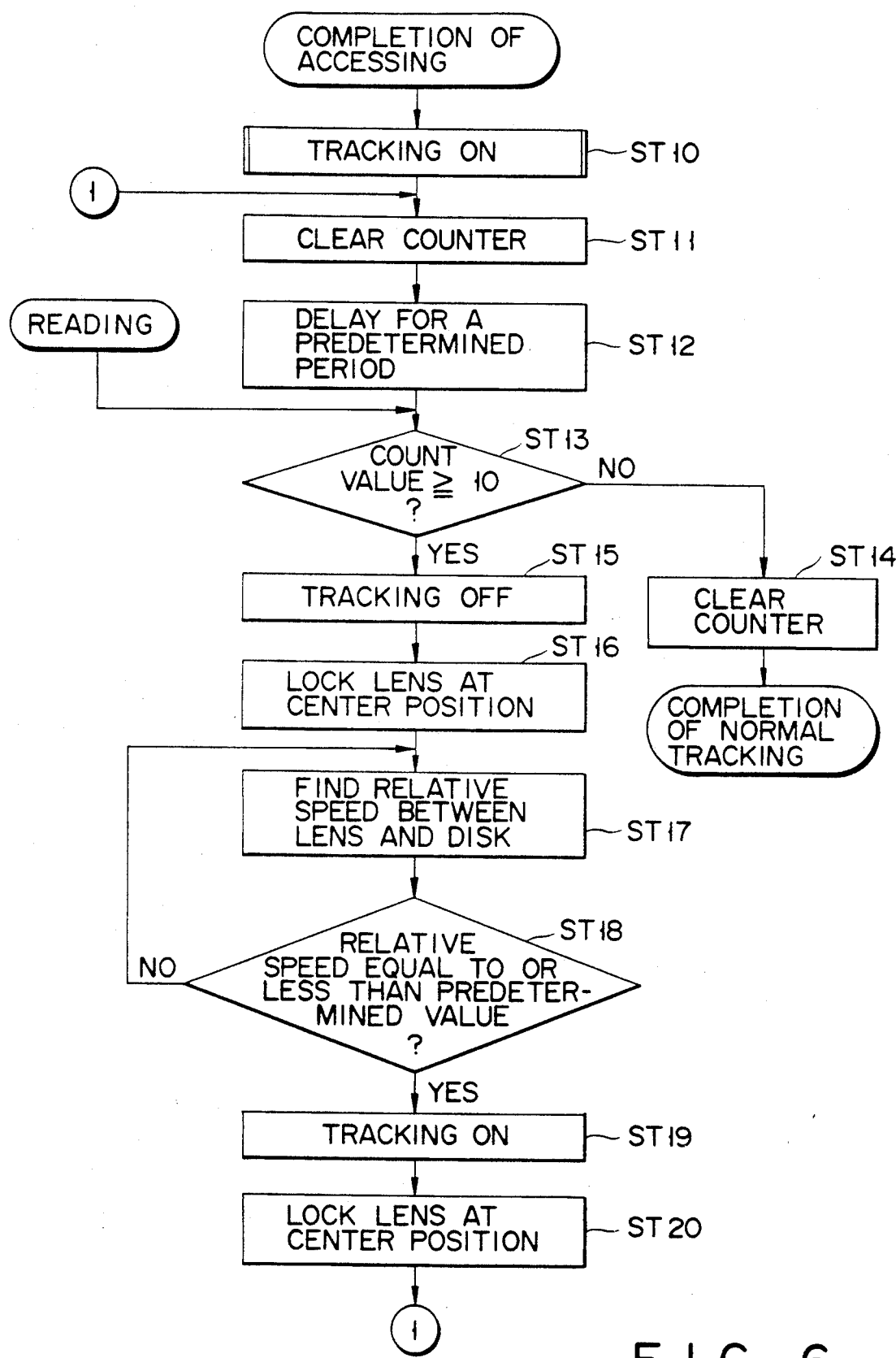

The operation of the optical disk apparatus. described above. will now be explained with reference to the flow chart shown in FIGS. 6 and 7. Assuming that the host computer 27 gives the number of a target track to the CPU 23 through the bus line 20. the CPU 23 compares the number of the target track with the number of the track which the optical head 3 is accessing actually. If the difference between the track numbers compared is 10 or more. the CPU 23 determines that the optical head 3 is performing coarse track-accessing.

When the CPU 23 determines that the optical head 3 is performing coarse track-accessing. it supplies to the linear motor controller 17 via the D/A converter 22 the data representing the scale value which corresponds to the number of the target track. The controller 17 applies an excitation current to the driver coil 13 of the linear motor 17a. which corresponds to. the scale value. thereby moving the linear motor 17a. As the motor 17a is moved in the radial direction of the optical disk 1. the optical head 3 is moved to the position defined by the scale value. As a result. the head 3 coarsely accesses the target track of the optical disk 1.

When the optical head 3 starts moving. the CPU 23 turns off the changeover switch SW1 of the tracking controller 16. whereby the tracking is interrupted. Simultaneously. the CPU 23 turns on the changeover switch SW2 of the tracking controller 16. Then. the differential amplifier 60 supplies the position signal (i.e.. the voltage proportional to the level difference between the output signal of the sensor 30 and the reference signal) to the driver circuit 64 through the switch SW2. the adder 61. the phase compensator 62. and the amplifier circuit 63. The driver circuit 64 drives the coils 4 in accordance with the position signal. and the coils 4 move the objective lens 6 to, and holds the lens 6 at. the center position with the optical head 3.

When the lens 6 is stopped at the center position within the optical head 3. that is. when the coarse track-accessing is completed. a reaction is applied to the objective lens 6. The lens 6 vibrates since it is supported by the wire suspensions 51. As a result. the spot. which the laser beams forms on the optical disk 1. moves across a track of the disk 1. In this case. the differential amplifier OP1 generates a tracking-error signal α (FIG. 5A) from the output signals of the tracking-position sensors 8 incorporated in the optical head 3. The signal α is supplied to the binary circuit 40. The circuit 40 converts the signal α to a binary signal β (FIG. 5B). The binary signal β is supplied to a counter 41. The counter 41 counts every binary signal output from the binary circuit 40. and outputs a signal which represents the count value γ (FIG. 5C). The count value γ is input to the CPU 23.

From the count value γ. the CPU 23 determines the frequency of the tracking-error signal α. Further. it determines the relative rate of change of tracking position (referred to as "speed" in FIG. 6) between the optical disk 1 and the objective lens 6 from the frequency of the tracking-error signal α. When this relative rate of change of tracking position decreases below a predetermined value. that is. when it becomes necessary to apply servo, or fine, tracking to the optical head 2. the CPU 23 causes the tracking controller 16 to start performing servo tracking. in step ST10 (FIG. 6). More precisely. as is illustrated in FIG. 5E, the internal counter 23a counts the sampling pulses whose number is proportional to the count value γ which the counter 41 has upon completion of the coarse accessing. When the count value of the counter 23a is 6 or more, the CPU 23 determines that the frequency of the tracking-error signal α has decreased. indicating a decrease in the relative rate of change of tracking position between the optical disk 1 and the objective lens 6. Then. the CPU 23 outputs a tracking-on signal to the tracking controller 16 and also to the counter 41.

The servo tracking will be explained in detail. with reference to FIG. 7.

First. the optical head 3 is stopped in step ST1. Next. the CPU 23 clears the internal counter 23a in step ST2. Then. in step ST3. the CPU 23 reads the count value γ of the counter 41, which is "1" at this time. Then, a predetermined time is made to lapse in step ST4. In the next step, ST5, upon lapse of this time, when the oscillator (not shown) outputs a sampling pulse, the CPU 23 reads the count value γ which the counter 41 has at this time. In step ST6, the CPU 23 determines whether or not the value γ is equal to the count value γ which has been read in step ST3. If YES, the count of the internal counter 23a is incremented by one, in step ST7. Then, in step ST8, the CPU 23 determines whether or note the count value of the counter 23a is greater than the predetermine value, i.e., "6." If NO, the operation returns to step ST4. The operation loop a consisting of steps ST4 to ST8 is repeated until the count value of the internal counter 23a increases to "6." When the count value of the counter 23a has reached the predetermined value of "6," the CPU 23 determines that the frequency of the tracking-error signal α has decreased and that the relative rate-of-change of tracking position the optical disk 1 and the objective lens 6 has become low. In step ST9, the CPU 23 outputs a tracking-on signal to the tracking controller 16 and also to the counter 41.

If NO in step ST5, that is, if the count value γ of the counter 41 has changed before it reaches the predetermined value of "6," the operation returns to step ST2, in which the internal counter 23a is cleared. The operation loop b consisting of step ST2 to ST6 is repeated until the CPU 23 determines, in step ST6, that the value γ read in step ST5 is equal to the value γ read in step ST3.

When the count value of the internal counter 23a is "1," the loop operation a is repeated three times before the next operation loop is performed. When the count value of the internal counter 23a is "2," the loop operation a is repeated two times before the next operation loop is performed. And, when the count value of the internal counter 23a is "6," the loop operation a is repeated six times before the next operation loop is performed. In each of these cases, the count value γ of the counter 41 remains unchanged, and the operation goes out of the loop operation a, whereby the CPU 23 yields as output a tracking-on signal in step ST9.

As can be understood from the above, the laser beam can be applied onto the target track, thus achieving a tracking-on, whenever the frequency of the signal α decreases, indicating that the relative rate of change of tracking position between the optical disk 1 and the objective lens 6 has become low. Even if the amplitude of the signal α changes very much immediately after the optical head 3 has been stopped, it suffices to clear the internal counter 23a. Also as can be understood from the above, the higher the frequency of the sampling pulse signal than that of the signal α, the less time is required to achieve the tracking-on. For example, when the sampling pulses are generated at the frequency of 2 KHz (one pulse every 500 μsec), whereas the frequency of the signal α is 1 KHz, the tracking-on can be accomplished more quickly than in the conventional optical disk apparatus wherein the laser emits a beam with a time lag after the optical head has been stopped. Obviously, the optical disk apparatus of this invention can access the target track at a higher speed.

The tracking-on signal supplied from the CPU 23 turns on the changeover which SW1 of the tracking controller 16, and turns off the changeover switch SW2 of the controller 16. As a result, the tracking-error signal α output by the differential amplifier OP1 is input to the driver circuit 64 through the changeover switch SW1, the adder 61, and the phase compensator 62. In response to the tracking-error signal α, the driver circuit 64 drives the drive coils 4, controlling the drive coils 4, such that the objective lens 6 is moved in the direction of arrow C (FIG. 3), thus carrying out servo, or fine, tracking as is illustrated in FIG. 5F. Now that the laser beam has been applied onto the target track of the optical disk 1, it traces the target track as the disk 1 is rotated.

As has been described, the laser beam is applied onto the target track when the relative rate-of-change of tracking position between the optical disk 1 and the objective lens 6 decreases after the coarse accessing has been completed. Then, as is shown in FIG. 6, the CPU 23 clears the counter 41 in step ST11. A predetermined time (e.g., a few milliseconds) is made to lapse in step ST12. In the next step, ST13, the CPU 23 determines whether or not the counter value γ of the counter 41 exceeds "3" or less. If NO, the operation goes to step ST14, in which the counter 41 is cleared, and no further control of the optical head 3 is performed.

When the coarse accessing is completed, reproduction circuit 19 reads the number of the track accessed, from the laser beam reflected from the track, and supplies to data representing the track number to the CPU 23. The CPU 23 compares this track number with the number of the target track. When the difference between the track numbers is ten or more, the CPU 23 drives the linear motor controller 17, whereby the coarse accessing is performed again. On the other hand, when the difference between the track numbers is less than ten, the CPU 23 drives the tracking controller 16, whereby the fine accessing (servo tracking) is performed. To be more precise, the tracking controller 16 outputs a track-jump signal to the drive coils 4, thereby moving the objective lens 6 in the radial direction of the optical disk 1. As a result of this, the laser beam is applied to the target track. Thus, data can be recorded on, or reproduced from, the target track of the optical disk 1.

If it is determined, in step ST13, that the count value γ of the counter 41 is "3" or more, the CPU 23 determines a tracking error, and outputs a tracking re-try signal to the tracking controller 16. As a result of this, the changeover switch SW1 of the controller 16 is turned off, thus terminating the tracking operation. Simultaneously, the changeover switch SW2 of the controller 16 is turned on, whereby a position signal, i.e., the voltage corresponding to the difference between the reference position signal and the output signal of the sensor 30, is supplied from the differential amplifier 60 to the driver circuit 64 via the switch SW2, the adder 61, the phase compensator 62, and the amplifier circuit 63. The driver circuit 64 drives the drive coils 4 in accordance with the position signal, thereby moving the objective lens 6 to the center position within the optical head 3.

To move the lens 6 to the center position within the optical head 3, the CPU 23 executes steps ST1 to ST9. That is, the CPU 23 causes the tracking controller 16 to start the servo tracking when the relative rate-of-change of tracking position between the disk 1 and the lens 6, which is determined from the frequency of the tracking-error signal α, decreases below the predetermined value (i.e., the relative rate-of-change of tracking position so low as requires the tracking servo) (steps ST15 to ST20). When the laser beam is applied to the target track, the operation returns to step ST11. During the servo tracking, the linear motor 13 keeps moving the head 3 in the radial direction of the optical disk 1, so that the laser beam traces the tracks. Hence, the CPU 23 determines again, from the count value γ of the counter 41, whether or not the beam is applied to the target track (steps ST11 to ST14).

Due to the servo tracking carried out in accordance with the position signal supplied the sensor 30 during the tracking re-try operation, the vibration of the objective lens 6 is suppressed. Therefore, the relative rate-of-change of tracking position between the disk 1 and the lens 6 is reduced even when the lens 6 is vibrating upon accessing the target track. This makes it easy to apply the laser beam to the target track. In addition, the tracking-on is started when the relative rate-of-change of tracking position between the disk 1 and the lens 6 becomes so low that the servo tracking is no longer required. Since the tracking is performed in accordance with the relative rate-of-change of tracking position between the disk 1 and the lens 6, the chance of successful tracking is great. Even if the tracking turns out to be unsuccessful, the tracking re-try operation is immediately achieved, to apply the laser beam to the target track.

The moment the disk 1 is rotated 360° for the first time after the counter 41 has been cleared while data is being reproduced from the track, the CPU 23 determines whether or not the count value γ of the counter 41 is greater than a prescribed value. If YES, the CPU 23 determines that a tracking error has been made, and outputs a tracking re-try signal to the tracking controller 16 in step ST13. Thereafter, steps ST15 to ST20 are preformed.

As has been described, the CPU 23 determines whether or not the tracking is successful upon the completion of the coarse accessing and during the data-reproducing operation. If NO due to the vibration of the head 3 caused by an external force upon the completion of the coarse accessing or during the data reproduction, the CPU 23 immediately outputs a tracking re-try signal to the tracking controller 16, thereby resuming the successful tracking. This helps to reduce the chance of tracking errors, and ultimately enhance the reliability of the optical disk apparatus.

Furthermore, since the tracking is resumed automatically when the relative rate-of-change of tracking position between the optical disk 1 and the objective lens 6, i.e., between the track and the laserbeam spot, decreases below a predetermined value upon the completion of the coarse accessing, the optical head 3 can apply the laser beam onto the target track. Therefore, the vibration of the objective lens 6 can be suppressed within a short time after the completion of the coarse accessing, whereupon the tracking by means of the lens 6 is started. As a result, the optical head 3 can access the target track at high speed.

What is claimed is:

1. An optical disk apparatus comprising:
   an optical head having focusing means for focusing a light beam along a light axis of said focusing means and onto an optical recording medium having tracks, and having detecting means for detecting a light beam reflected from said optical recording medium and for outputting a detection signal;
   drive means for moving said focusing means in a direction perpendicular to the light axis of said focusing means;
   signal-generating means for generating a tracking-error signal, with a frequency, in response to the detection signal output from said detecting means;
   tracking means for causing said drive means to adjust a relative position between said focusing means and a target track of the optical recording medium, and to move said focusing means to the target track in response to the tracking-error signal generated by said signal-generating means;
   first judging means for determining a tracking error, corresponding to a plurality of tracks, from the tracking-error signal generated by said signal-generating means;
   positioning means for positioning said focusing means at a predetermined position within said optical head when said first judging means determines the tracking error;
   second judging means for determining that a rate of change in position between said focusing means and said optical recording medium becomes lower than a predetermined value in response to a detection that the frequency of the tracking-error signal becomes lower than a predetermined frequency, when said focusing means is moved to the predetermined position within said optical head; and
   control means for controlling said tracking means, such that said tracking means causes said drive means to stop moving said focusing means to the target track when first judging means determines the tracking error, and to start moving said focusing means to the target track when said second judging means determines a decrease in the rate of change in position between the optical recording medium and said focusing means below the predetermined value, after said focusing means has been positioned at the predetermined position within said optical head by said positioning means.

2. The optical disk apparatus according to claim 1, wherein said tracking means comprises a phase-compensating circuit, an amplifier circuit, and a driver.

3. The optical disk apparatus according to claim 1, wherein said control means comprises a differential amplifier, changeover switches, an adder circuit, and a CPU.

4. The optical disk apparatus according to claim 1, wherein said second judging means comprises a binary circuit, a counter, a CPU, and an internal memory.

5. The optical disk apparatus according to claim 1, wherein said signal-generating means comprises a differential amplifier.

6. An optical disk apparatus according to claim 1, wherein said second judging means includes:
   a binary circuit for deriving binary signals from the tracking-error signal generated by said signal-generating means;
   a counter, coupled to the binary circuit, for counting the binary signals derived by said binary circuit and for outputting a count value;
   counting means, coupled to the counter, for counting the number of sampling pulses corresponding to the count value counted by the counter;
   detecting means, responsive to a change in the count value output from the counter, for detecting the frequency of the tracking-error signal on the basis of results of the counting performed by the counting means; and
   determination means, for determining that the frequency of the tracking-error signal detected by said detecting means becomes lower than the predetermined frequency.

wherein said second judging means determines that the rate of change in position between the focusing means and the optical recording medium decreases if the determination means determines that the frequency of the tracking-error signal becomes lower than the predetermined frequency.

7. An optical disk apparatus according to claim 3, wherein said second judging means includes:
   a binary circuit for deriving a binary signal from the tracking-error signal generated by the signal-generating means;
   a counter, coupled to the binary circuit, for counting the binary signal derived by the binary circuit;
   counting means coupled to the counter, for counting the number of sampling pulses corresponding to the count value counted by the counter;
   detecting means, responsive to a change in the count of the counter, for detecting the frequency of the tracking-error signal on the basis of the number of sampling pulses counted by the counting means; and
   determining means for determining that the frequency of the tracking-error signal detected by said detecting means becomes lower than the predetermined frequency.

wherein the judging means determines that the rate of change in position between the focusing means and the optical recording medium decreases if the determination means determines that the frequency of the tracking-error signal becomes lower than the predetermined frequency.

8. An optical disk apparatus comprising:
   an optical head having focusing means for focusing a light beam along a light axis of said focusing means and onto an optical recording medium having tracks, and having detecting means for detecting a light beam reflected from the optical recording medium and for outputting a detection signal;
   mode setting means for selectively setting one of a coarse track accessing mode, for making said optical head coarsely access a target track through a plurality of tracks, and a fine track accessing mode, for making said optical head finely access the target track;
   means, coupled to the mode setting means, for producing a first drive signal;
   first drive means, coupled to the first drive signal means, for moving said optical head in a radial direction of the optical recording medium through the plurality of tracks, in response to the first drive signal, when the coarse track accessing mode is set;
   second drive means, coupled to the focusing means, for moving said focusing means in a direction perpendicular to the light axis of said focusing means in response to a second drive signal;
   first signal-generating means, coupled to the detecting means, for generating a tracking-error signal, with a frequency, in response to the detection signal output from said detecting means;
   tracking means, coupled to the second drive means, for causing said second drive means to adjust a relative position between said focusing means and the target track of said optical recording medium in the fine track accessing mode after the first drive means has moved said optical head in the coarse track accessing mode, and to move said focusing means to the target track in response to the tracking-error signal generated by said first signal-generating means;
   second signal-generating means, coupled to the tracking means, for generating the second drive signal and for operating said second drive means;
   positioning means, coupled to the second drive means, for causing said second drive means to position said focusing means at a predetermined position within said optical head when said coarse track accessing mode is set and a predetermined time has elapsed, or in response to the tracking-error signal;
   judging means, coupled to said focusing means, for determining that a rate of change in position between said focusing means and said optical recording medium becomes lower than a predetermined value in response to a detection that the frequency of the tracking-error signal becomes lower than a predetermined frequency when said coarse track accessing mode is set; and
   control means, coupled to said tracking means, for controlling said tracking means such that said tracking means causes said second drive means to position said focusing means at the predetermined position, and to cause said mode setting means to set the fine track access mode after said optical head is moved to the target track in response to the first drive signal, and to position said focusing means at the target track when said judging means determines a decrease in the rate of change in position between the optical recording medium and said focusing means below the predetermined value.

9. The optical disk apparatus according to claim 8, wherein said tracking means comprises a phase-compensating circuit, an amplifier circuit, and a driver.

10. The optical disk apparatus according to claim 8, wherein said control means comprises a differential amplifier, changeover switches, an adder circuit, and a CPU.

11. The optical disk apparatus according to claim 8, wherein said second judging means comprises a binary circuit, a counter, a CPU, and an internal memory.

12. The optical disk apparatus according to claim 8, wherein said signal-generating means comprises a differential amplifier.

* * * * *